United States Patent [19]
Evans

[11] Patent Number: 5,262,781
[45] Date of Patent: Nov. 16, 1993

[54] WIDEBAND ELECTROMAGNETIC IMAGING SYSTEM

[75] Inventor: David Evans, San Diego, Calif.

[73] Assignee: Teledyne Ryan Aernautical, Division of Teledyne Industries, Inc., San Diego, Calif.

[21] Appl. No.: 957,145

[22] Filed: Oct. 7, 1992

[51] Int. Cl.$^5$ .............................................. G01S 13/00
[52] U.S. Cl. ........................................ 342/25; 342/165
[58] Field of Search ......................... 342/25, 165, 173

[56] References Cited

U.S. PATENT DOCUMENTS

| | | | |
|---|---|---|---|
| 3,121,868 | 2/1964 | Hausz et al. | 342/25 |
| 3,975,734 | 8/1976 | Payne | 342/25 |
| 4,723,124 | 2/1988 | Boles . | |
| 4,771,287 | 9/1988 | Mims | 342/25 |
| 4,855,747 | 8/1989 | Steinberg . | |
| 5,140,331 | 8/1992 | Aulenbacher et al. | 342/165 |

FOREIGN PATENT DOCUMENTS 0222284 9/1988 Japan .
0222287 9/1988 Japan .
2202705 9/1988 United Kingdom .

*Primary Examiner*—Mark Hellner
*Attorney, Agent, or Firm*—Brown, Martin, Haller & McClain

[57] ABSTRACT

A synthetic aperture radar (SAR) system for determining the location of scattering centers on low-observability aircraft or other vehicles has an antenna that moves along a linear track relative to the stationary unit under test. When the scan is complete, the system produces an image of the aircraft showing the scattering centers. The system may then superimpose graphics representing the outline of the unit under test on the image. The operator may use the graphics to correlate the scattering centers in the image with corresponding areas of the aircraft.

10 Claims, 1 Drawing Sheet

WIDEBAND ELECTROMAGNETIC IMAGING SYSTEM

BACKGROUND OF THE INVENTION

The present invention relates generally to synthetic aperture radar systems and, more specifically, to a synthetic aperture radar system for mapping a vehicle radar cross section to identify areas of significant scattering.

Synthetic aperture radar (SAR) has long been used to produce two-dimensional radar images of a target. The theory of SAR is well-known and described in Skolnik, *Radar Handbook*, McGraw-Hill, New York, 1970. Briefly, SAR increases the effective aperture size of the radar by moving the antenna relative to the target. This movement increases target resolution far beyond the resolution achievable with a stationary antenna of the same physical size.

SAR is most commonly used in airborne or space-borne radars to produce high-resolution images of the ground or ocean. As the radar platform traverses a linear path, sequential amplitude and phase data are received from a single antenna and stored. Well-known signal processing techniques, such as two-dimensional Fourier transforms, are then used on the stored data to produce an image of the terrain over which the antenna has passed.

The resolution of the image depends upon the effective aperture size, $L_{eff}$, which is the velocity of the aircraft divided by the time period over which the data is collected. The effective beamwidth of the antenna, $\beta_{eff}$, is the wavelength, $\xi$, divided by twice the effective aperture, $L_{eff}$. The azimuthal resolution of the image, $\delta_a$, is equal to the effective beamwidth ($\beta_{eff}$) multiplied by the range from the antenna to the ground, i.e., the altitude of the aircraft.

Resolution in the range or longitudinal dimension can be achieved by sweeping the radar pulses in frequency. The range resolution, $\delta_r$ is the velocity of the radar pulses, c, divided by twice the bandwidth of the frequency sweep.

SAR has also been used to form images of underground objects and of ships at sea. U.K. Patent 2,202,705 discloses a transmitting antenna and a receiving antenna disposed a fixed distance apart that move in unison over the surface of the ground in a direction perpendicular to the line between them. U.S. Pat. No. 4,723,124 issued to Boles describes a shipboard SAR having a phased array antenna. Reflections from target scattering centers are received and used to form an image of the target ship.

When SAR is used for imaging terrain, ships, underground objects, and other similar targets, it is desirable for the objects to backscatter a large portion of the radar energy. It is not possible, of course, to form a SAR image of an object that does not backscatter radar energy. The areas of the target having strong backscattering are known as "scattering centers."

In recent years, much effort has been directed towards producing aircraft that are difficult to detect using radar. These low-observability (LO) or "stealth" aircraft are difficult to detect because they employ various means to minimize the backscattering of radar energy.

The effectiveness of these means for reducing backscatter must presently be tested either while the aircraft is in flight or by measuring the backscatter from the aircraft with a stationary radar while rotating the aircraft. Moving a target relative to a stationary antenna is known as Inverse Synthetic Aperture Radar (ISAR), which can be used to produce a radar cross section image in which the scattering centers are clearly identifiable. Such ISAR test ranges must include a large turntable for supporting and rotating an aircraft to be imaged. Furthermore, the ISAR must image the aircraft in a large, open area or an anechoic chamber because the image of the aircraft will be obscured if the radar receives backscatter from points that are stationary relative to the radar. Thus, ISAR test ranges are neither easily transported nor quickly readied for use.

Scattering centers may be produced on the LO aircraft by patches of dirt, production defects, exterior damage, or incompletely closed access doors. Such conditions may go unnoticed by maintenance personnel and pilots in the field. Furthermore, repairs and production defects may leave imperfections that may not be detected by visual inspections. As a result, the aircraft may be vulnerable to radar detection. Unless the aircraft is brought to an ISAR test range, these conditions will often remain undetected.

A compact device for quickly and easily pinpointing scattering centers of an aircraft or other vehicle either in the field or on the factory floor would be highly desirable. These problems and deficiencies are clearly felt in the art and are solved by the present invention in the manner described below.

SUMMARY OF THE INVENTION

The present invention uses synthetic aperture radar (SAR) to locate scattering centers on vehicles such as low-observability (LO) aircraft. The present invention comprises a coherent radar, an antenna that moves along a linear track for transmitting and receiving radar signals, a computer for manipulating the received data and controlling the positioning of the antenna, and an output device such as a cathode ray tube (CRT) or pen plotter.

The antenna is mounted on a linear track. The track is placed in front of the unit under test (UUT), which may be a LO aircraft. Under the control of the computer, a small motor or other suitable driving means moves the antenna from one end of the track to the other to complete a scan of the UUT. As the antenna moves past the UUT, the radar provides the computer with amplitude and phase data that corresponds to the backscattered radar energy. When the scan is complete, the computer or other suitable signal processing means performs a two-dimensional Fourier transform on the data to transform the data to the spatial domain, thereby producing an image of the UUT. This transformation is well-known and not described in detail herein. Variations in the image correspond to variations in radar energy backscattering.

The computer may then superimpose graphics representing the outline of the UUT on the image and the resulting image and graphics may be displayed on a cathode ray tube or plotted on a pen plotter. The operator may use the graphics to correlate the scattering centers in the image with corresponding areas of the UUT.

Even though the UUT may be designed to minimize scattering centers, all UUTs can be expected to produce some scattering centers. The usefulness of the image can be improved by subtracting from it an "expected"

image consisting of the scattering centers that are unavoidable due to the inherent design of the UUT. The resulting difference image shows only the scattering centers caused by conditions that can be eliminated by maintenance or flight personnel. The difference image may be displayed on a CRT or other suitable output means in any suitable format, such as a contour plot. The operator may then inspect the areas of the UUT that correspond to the scattering centers remaining in the difference image. The expected images for all UUT types to be tested may be prestored in a database.

The invention can be easily transported and quickly readied for use. Furthermore, the area near the UUT need not be prepared in any special manner nor must the test be performed in a special environment. Thus, the test may be performed on a factory floor or aircraft carrier deck. Unlike an ISAR test system, the image is not obscured by clutter in such an environment because antenna moves relative to both the UUT and the area around it. Thus, the UUT can easily be differentiated from objects near the UUT. The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is made to the following detailed description of the embodiments illustrated in the accompanying drawings, wherein.

DESCRIPTION OF THE PREFERRED EMBODIMENT

Figure 1:
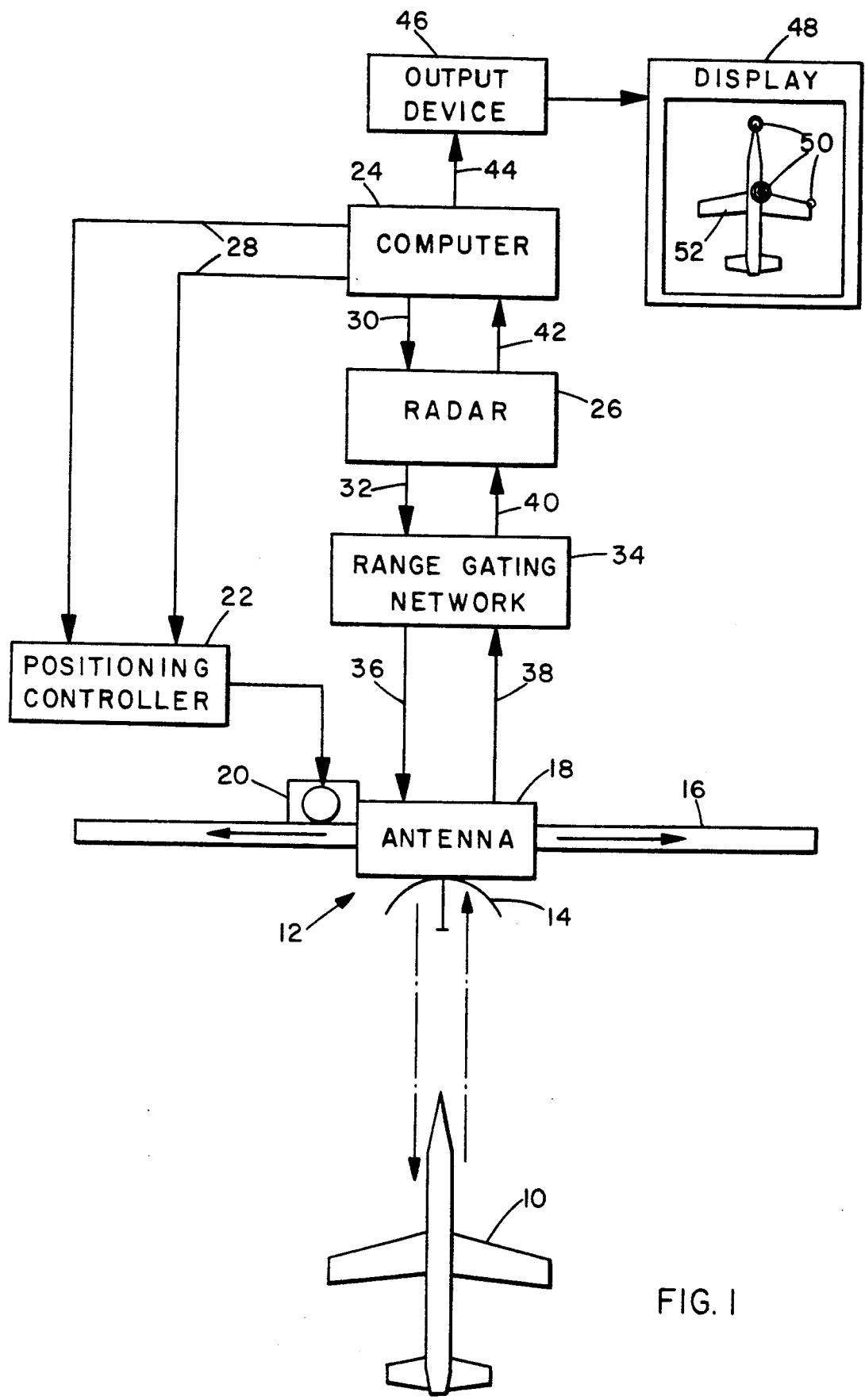
FIG. 1 is a block diagram of the present invention.

In FIG. 1, the present invention forms a radar cross-section image of a unit under test (UUT) 10. A linear positioner 12 moves an antenna 14 along a path in front of UUT 10. Antenna 12 may be any suitable broadband antenna and preferably has a beamwidth between 20° and 30°. Linear positioner 12 comprises a track 16, a carriage 18 slidably mounted on track 16, and a motor 20, which moves carriage 18 and antenna 14 along track 16. Track 16 should preferably be at least as wide as UUT 10. Positioning controller 22 controls motor 20 and can position carriage 18 and antenna 14 at a plurality of discrete points along track 16.

A computer 24 controls positioning controller 22 and a radar 26. Radar 26 may be any suitable coherent radar. Radar 26 preferably produces signals having low power levels, such as between 100 milliwatts (mW) and 1 watt (W), to allow operation in crowded areas without injury to personnel. Although radar 26 may produce pulses having any suitable width and repetition rate, a pulse-width of between 25 and 250 nanoseconds (ns) and a repetition rate of between 10 and 50 kilohertz (kHz) is preferred.

To perform the test, an operator (not shown) places linear positioner 12 in a known position and orientation relative to UUT 10 with antenna 14 facing UUT 10. The operator enters the position and orientation information into computer 24. Computer 24 then begins the test in response to a command entered by the operator. Computer 24 sends positioner command signals 28 to positioning controller 22 for moving antenna 14 to one end of track 16. Computer 24 then sends radar command signals 30 to radar 26.

In response to radar command signals 30, radar 26 produces radar signals 32 at a predetermined minimum frequency, such as 6 gigahertz (GHz) for transmission by antenna 14. A range-gating network 34 may be included between radar 28 and antenna 14 for reducing the competition between the received signal and excess receiver noise. Antenna 14 transmits radar signals 36 received from range-gating network 34 and receives backscattered radar signals 38, which it provides to range-gating network 34. Radar 26 receives range-gated backscattered radar signals 40, measures the amplitude and phase of signals 40 and provides the amplitude and phase data 42 to computer 24. Computer 24 stores amplitude and phase data 42 received while antenna 14 is at one end of track 16.

Computer 24 then sends radar command signals 30 for incrementing the frequency of radar signals 36 by a predetermined frequency increment. Radar signals 36 having the incremented frequency are transmitted and received as described above. Computer 24 stores amplitude and phase data 42 received while antenna 14 is at one end of track 16 and radar signals 36 are at the incremented frequency. In this manner, computer 24 repeatedly increments the frequency of radar signals 36 and stores amplitude and phase data 42. When computer 24 has stored amplitude and phase data 42 corresponding to radar signals 36 transmitted at a predetermined number of discrete frequencies between the minimum frequency and a maximum frequency, such as 18 GHz, it moves antenna 14 to a new location. The number of frequencies through which radar signals 36 are swept determines the image resolution in the longitudinal direction.

Computer 24 sends positioner command signals 28 to positioning controller 22 for moving carriage 18 and antenna 14 by a predetermined increment towards the end of the track opposite the end at which the test begins. The increment size determines the image resolution in the azimuthal direction. At the new location, computer 24 again gathers amplitude and phase data 42 corresponding to each of the predetermined frequencies in the range through which radar signals 36 are swept. In this manner, computer 24 successively moves antenna 14 to a predetermined number of discrete locations along track 16, sweeping radar signals 36 through the range of frequencies and storing the measured amplitude and phase data 42 corresponding to each frequency at each location. When antenna 14 has reached the end of track 16 opposite the end at which the test began and computer 24 has stored amplitude and phase data 42 corresponding to each frequency through which radar signals 36 have been swept at that location, computer 24 processes the stored amplitude and phase data (not shown). Computer 24 may use a two-dimensional Fourier transform or other suitable processing algorithm. Such processing algorithms are well-understood in the art and are not discussed herein.

Computer 24 produces image data 44, which represents the radar cross section of UUT 10 and comprises an array of pixels. An array of about 200 pixels in each dimension can typically be produced within about 20 minutes using wellknown processing algorithms and a personal computer. The processing gain for such a 200×200 pixel image is typically about 46 dB. This high processing gain allows a radar 26 having the relatively low power described above to be used. Image data 44 may be sent directly to an output device 46 or may undergo additional processing.

Image data 44 may, for example, be processed to blank all pixels below a predetermined threshold. Thus, only the scattering centers will appear in the final image. Alternatively, an "expected" radar cross section image of a UUT that is completely free of defects, contaminants, and other undesirable characteristics that would create scattering centers, may be subtracted from image data 44. The resulting difference image shows only those scattering centers that are unavoidable due to the inherent characteristics of the UUT. Computer 24 may include a library of such expected images on a storage medium (not shown), such as a disk or tape.

Output device 46, which may be a pen plotter or a cathode ray tube, produces a display 48 of the difference image showing scattering centers 50 on UUT 10. Display 48 is preferably a contour plot because the relative strength of scattering centers 50 can be easily determined. In other embodiments, such as where display 48 is a cathode ray tube, the relative strength of scattering centers 50 may be represented by differences in color.

In addition, computer 24 may superimpose graphics 52, representing the outline of UUT 10, on the difference image. Graphics 52 allow an operator to locate the areas of UUT 10 that are creating scattering centers 50. The operator can easily distinguish scattering centers 50 produced by UUT 10 from those produced by any objects imaged along with the UUT because such scattering centers would lie outside graphics 52. Computer 24 can position and scale the difference image or graphics 52 to ensure that they are aligned because computer 24 has information corresponding to the position and orientation of linear positioner 12 relative to UUT 10.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

I claim:

1. A ground-based imaging system for measuring the radar cross section of a target, comprising:
    an antenna for emitting radio frequency energy along an axis and for receiving radio frequency energy backscattered from said target;
    a linear positioner for moving said antenna along a linear path substantially perpendicular to said axis, said linear positioner comprising a fixed portion disposed in fixed relation to said target and a moving portion disposed in movable relation to said target, said fixed portion defining said path, and said path comprising a plurality of locations;
    a coherent radar for providing said radio frequency energy to said antenna and for producing amplitude data and phase data corresponding to said backscattered radio frequency energy at each location of said plurality of locations;
    a processor for successively positioning said antenna at each said location and for producing image data in response to said amplitude data and said phase data; and
    output means for producing a visual representation of said image data.

2. An imaging system as described in claim 1, wherein said stationary portion comprises a track for engaging and guiding said moving portion and a motor for moving said moving portion relative to said stationary portion, and said antenna is mounted on said moving portion.

3. An imaging system as described in claim 1, further including a range-gating network between said radar and said antenna.

4. An imaging system as described in claim 3, wherein said radio frequency energy has a frequency between 6 GHz and 18 GHz.

5. An imaging system as described in claim 4, wherein said visual representation is a contour plot.

6. A method for locating scattering centers of a target, comprising the steps of:
    pointing an antenna in a direction toward said target, said antenna mounted on a linear positioner having a stationary portion disposed in fixed relation to said target and a moving portion disposed in movable relation to said target for mounting said antenna thereon, said stationary portion defining a linear path perpendicular to said direction;
    moving said moving portion relative to said stationary portion along said linear path;
    emitting radio frequency energy at a plurality of successive locations along said linear path;
    receiving backscattered radio frequency energy at each location of said plurality of successive locations;
    producing and storing amplitude and phase data corresponding to said received radio frequency energy; and
    producing a target image in response to said stored amplitude and phase data.

7. An imaging system as described in claim 6, wherein said emitting step comprises emitting radio frequency energy at a predetermined range of discrete frequencies at each said location, said amplitude and phase data corresponding to said received radio frequency data at each discrete frequency of said range.

8. An imaging system as described in claim 7, further comprising the steps of:
    comparing said target image to a pre-stored image having expected scattering centers; and
    subtracting said pre-stored image from said target image, whereby a difference image is produced.

9. An imaging system as described in claim 8, further comprising the step of superimposing a graphical image of said target on said target image.

10. An imaging system as described in claim 9, wherein said difference image is a contour plot.

* * * * *